United States Patent
Yoshimura et al.

(10) Patent No.: US 7,764,300 B2
(45) Date of Patent: Jul. 27, 2010

(54) OPTICAL RECORDING MEDIUM AND DATA RECORDING DEVICE

(75) Inventors: Ryuichiro Yoshimura, Tokorozawa (JP); Hidenori Nakagawa, Tokorozawa (JP); Takayuki Yamamoto, Tokorozawa (JP); Takashi Nakai, Tokorozawa (JP); Yuichi Mizuuchi, Tokorozawa (JP); Kazumasa Nakamura, Tokorozawa (JP); Shinzo Kawakami, Tokorozawa (JP); Takehiro Otsuki, Tokyo (JP); Takashi Nakamura, Tokyo (JP); Akio Fukushima, Tokyo (JP); Hiroki Yamaguchi, Tokorozawa (JP); Naoki Yamada, Tokorozawa (JP); Tomonori Nakada, Tokorozawa (JP); Kenichi Oono, Tokorozawa (JP); Kouji Harimoto, Tokorozawa (JP); Eiji Konosu, Tokyo (JP); Hajime Ishizuka, Tokyo (JP); Tak Kai, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 945 days.

(21) Appl. No.: 10/573,968

(22) PCT Filed: Sep. 28, 2004

(86) PCT No.: PCT/JP2004/014190
§ 371 (c)(1),
(2), (4) Date: Mar. 30, 2006

(87) PCT Pub. No.: WO2005/031727
PCT Pub. Date: Apr. 7, 2005

(65) Prior Publication Data
US 2007/0002721 A1   Jan. 4, 2007

(30) Foreign Application Priority Data
Sep. 30, 2003   (JP) ............................... 2003-340921

(51) Int. Cl.
*B41J 2/435* (2006.01)
(52) U.S. Cl. .................................................. 347/224
(58) Field of Classification Search ................. 347/224, 347/225, 251; 369/108, 116, 275.1; 250/201.5
See application file for complete search history.

(56) References Cited

U.S. PATENT DOCUMENTS 5,473,154 A * 12/1995 Eguchi et al. ............. 250/201.5
6,778,205 B2 * 8/2004 Anderson et al. ........... 347/251

(Continued)

FOREIGN PATENT DOCUMENTS

JP   2001-283470 A   10/2001
JP   2003-217169 A   7/2003

*Primary Examiner*—Hai C Pham
(74) *Attorney, Agent, or Firm*—Sughrue Mion, PLLC

(57) ABSTRACT

In an optical disk manufacturable by a conventional recording medium manufacturing method and that is capable of performing recording with an information recording apparatus used to perform recording on conventional recording mediums, and a data recording apparatus for recording contents data, an optical disk has a structure in which a first substrate and a second substrate are bonded together, the first substrate is provided with a recording layer in which contents data is recorded, and the second substrate is provided with a visual information recording layer in which information enabling visual recognition of, for example, the contents of contents data or a title of the contents data is recorded as visual information.

12 Claims, 7 Drawing Sheets

U.S. PATENT DOCUMENTS

| | | | |
|---|---|---|---|
| 7,082,094 B2 * | 7/2006 | Morishima et al. | 369/116 |
| 2001/0026531 A1 * | 10/2001 | Onodera et al. | 369/284 |
| 2003/0117932 A1 * | 6/2003 | Morishima et al. | 369/116 |
| 2004/0062179 A1 * | 4/2004 | Tsurumi et al. | 369/108 |
| 2005/0265211 A1 * | 12/2005 | Nakane et al. | 369/275.1 |

* cited by examiner

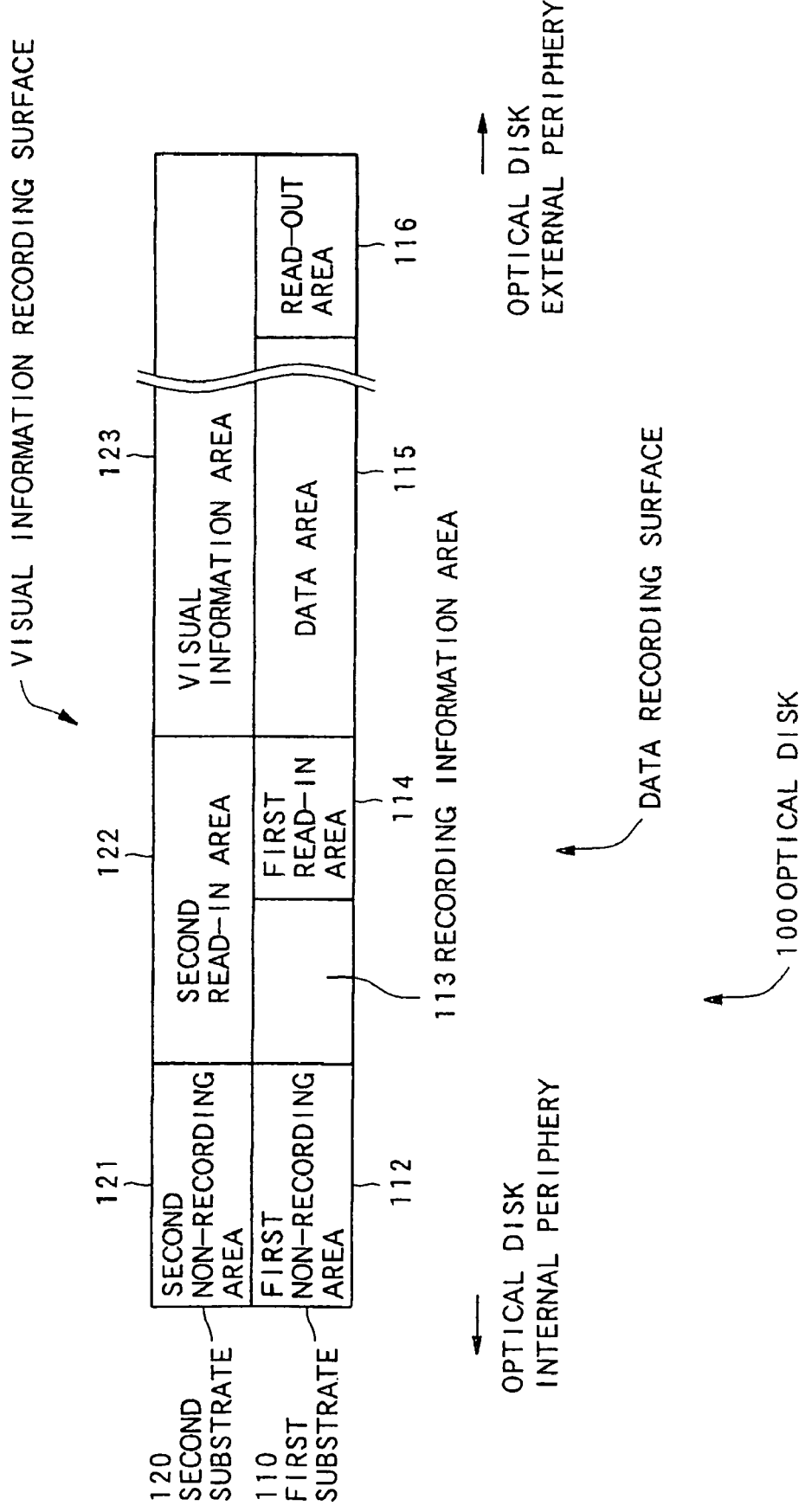

OPTICAL RECORDING MEDIUM AND DATA RECORDING DEVICE

TECHNICAL FIELD

The present invention fall into the technical field of optical recording media that record visual information on a surface different from a recording surface to record contents data.

BACKGROUND ART

In recent years, as disk-shaped information recording mediums capable of high-density information recording, so-called DVD (digital versatile disc) devices are generalized. In addition, data-writable DVD devices, such as DVD-R (DVD-Recordable) devices capable of only one time recording and DVD-RW (DVD-Rewritable) devices capable of multi-time rewriting are used in practical application.

Conventionally, in the case of optical disks, such as writable optical disks, it is known that in the event of recording contents data, the contents, a title thereof, and the like of recorded contents data are printed or written by an inkjet printer or handwriting on a surface ("label surface", hereafter) of an optical disk different from a surface ("data recording surface", hereafter) bearing the recorded contents data for identification of the disk from other optical disks or for indicating the recorded contents.

In addition, recently, in the case of such writable optical disks, it is known that the contents of contents data, a title thereof, and the like are recorded as visual information onto a free area of the data recording surface by using a laser beam or laser light.

In the case of DVD devices of the type recording the contents of contents data on the data recording surface, an irradiation portion and non-irradiation portion of laser light are formed on the data recording surface. The laser light irradiation portion and non-irradiation portion cause variations in optical characteristics to thereby record the visual information (see Patent Document 1, for example).

Patent Document 1: Japanese Patent Application Laid-Open No. 2001-283470

DISCLOSURE OF INVENTION

Problems to be Solved by the Invention

In the case of conventional optical disks on which contents data is recorded, in the event of such inkjet printing of visual information on the label surface, the recording medium has to be manufactured such that printable label surface is preformed thereon. In addition, in the event of recording of visual information with laser, since the surface on which the visual information is formed is used as the data recording surface, problems are not only that the visual information cannot be easily recognized, but also that, when there is not a free area available, the visual information cannot be sufficiently recorded.

The present embodiment is made in view of the respective problems described above, one example of objects of the invention is to provide an optical disk manufacturable by a conventional recording medium manufacturing method and is recordable by an information recording apparatus and to provide a data recording apparatus for recording contents data on the optical disk.

Means for Solving the Problems

The above object of present invention can be achieved by the present invention of claim 1. The present invention of claim 1 is provided with; a data recording layer on which contents data is recorded by irradiation of an optical beam, and a visual information recording layer on which visual information which is visually recognized and indicative of information regarding the contents of the contents data is recorded by irradiation of the optical beam, wherein the data recording layer and the visual information recording layer are laminated.

The above object of present invention can be achieved by the present invention of claim 9. The present invention of claim 1 records visual information onto an optical recording medium formed by lamination of a data recording layer onto which contents data is recorded, and a visual information recording layer on which visual information which is visually recognized and indicative of information regarding the contents of the contents data is recorded, the present invention is provided with; an interface that receives the visual information to be recorded; a pickup that is used to record the received visual information; and a visual-information dedicated drive signal generating device that generates a visual-information dedicated drive signal for driving the pickup in accordance with the received visual information, wherein the pickup records the visual information onto the visual information recording layer in accordance with the generated visual-information dedicated drive signal.

BRIEF DESCRIPTION OF THE DRAWINGS

FIG. 2 is a view showing a data structure of the optical disk of the first embodiment according to the present invention.

REFERENCE NUMERALS

| | |
|---|---|
| 110 | first substrate |
| 114 | first read-in area |
| 115 | data area |
| 120 | second substrate |
| 122 | second read-in area |

-continued

| | |
|---|---|
| 123 | visual information area |
| 200, 300 | data recording and playback apparatus |
| 201 | pickup |
| 204 | data recording encoder |
| 205 | visual information recording encoder |
| 206 | drive shift control unit |
| 210 | system control unit |
| 301 | first pickup |
| 302 | second pickup |

BEST MODE FOR CARRYING OUT THE INVENTION

Preferred embodiments of the present invention will be described hereinbelow with reference to the drawings.

Embodiments described below are each in the case that an inventive optical recording medium and data recording apparatus for recording data onto the medium are adapted to an optical disk for recording contents data contained in, for example, a DVD-R or DVD-RW device, and to a data recording and playback apparatus for recording contents data and visual information onto the optical disk.

First Embodiment

First, a first embodiment of a respective optical disk and data recording and playback apparatus will be described hereinbelow with reference to FIGS. 1 to 5.

To begin with, a physical structure and data structure of the optical disk in the present embodiment will be described with reference to FIGS. 1 to 3.

Figure 1:
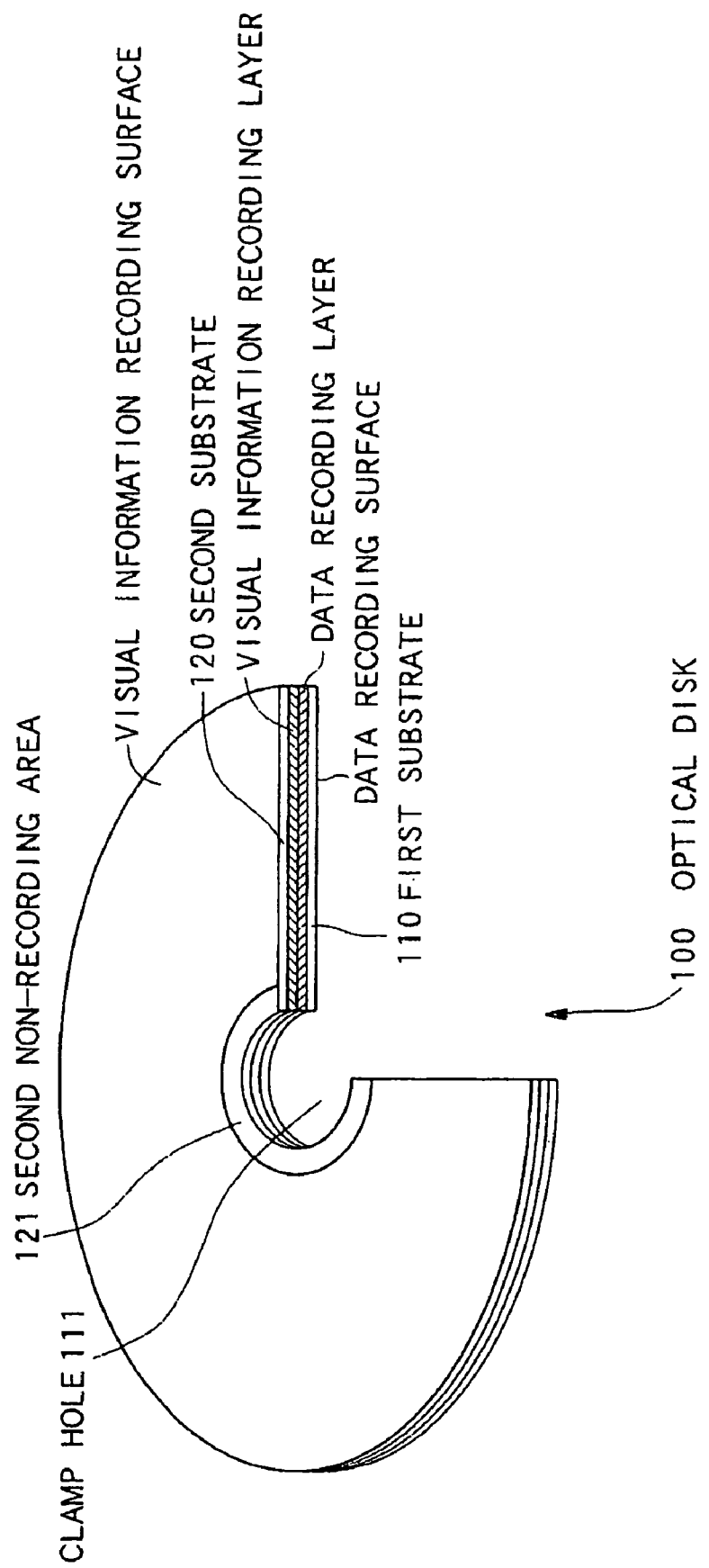
FIG. 1 is a view showing a physical structure of an optical disk of a first embodiment according to the present invention.

FIG. 1 is a view showing the physical structure of the optical disk of the present embodiment, and FIG. 2 is a view showing the data structure of the optical disk of the present embodiment.

FIG. 3 is one example of the optical disk when visual information is recorded thereon in the first embodiment.

With reference to FIG. 1, an optical disk 100 has a structure formed by bonding a first substrate 110 and a second substrate 120. On the first substrate there is provided a recording layer ("data recording apparatus", hereafter) for recording contents data. On the second substrate there is provided a recording layer ("visual information recording layer", hereafter) for recording visually recognizable information, such as information on the contents of contents data or a title of the contents data, as visual information.

The first substrate 110 is provided with a data recording layer provided on the side of the second substrate 120 and is formed of a transparent material permeable to the laser. The first substrate 110 is formed on the data recording surface that irradiated with the laser light.

More specifically, the first substrate 110 is provided with the data recording layer formed of a phase change film that changes the reflectance by using the crystallized condition of a substance, thereby to record the contents data and other data by changing the reflectance of the phase change film.

The second substrate 120 is provided with a visual information recording layer provided on the side of the first substrate 110 and is formed of a transparent material permeable to the laser, similarly as the first substrate 110. The second substrate 120 is formed on the label surface on the side opposite to the data recording surface.

More specifically, the second substrate 120 is provided with the visual information recording layer that contains dyes different from one another in reflectance depending on irradiation of the laser light. An example of the film is a film that has characteristics in which high reflection light energy is produced when the film is not irradiated by the laser light and the reflection light energy reduces upon irradiation of the laser light.

The optical disk 100, which has the physical structure described above, has a data structure shown in FIG. 2. On the recording layer formed on the first substrate 110, there are, in order from the inner periphery side, a clamp hole 111 for fixing the optical disk 100 to a spindle of a spindle motor (not shown) of a playback apparatus for performing playback of the optical disk 100; a first non-recording area 112 used to fix the disk; a recording information area 113 for adjusting the laser light in the event of writing of contents data; a first read-in area 114 recording management information for being used to manage or control recording and playback of the contents data; a data area 115 for recording the contents data; and a read-out area 116 for recording various types of information for being used for information recording termination and information playback termination.

For example, in the present embodiment, the first read-in area 114 serves as a data management area of the present invention, and the data area 115 serves as a data recording area of the present invention.

More specifically, in the recording information area 113 there are provided, for example, an area (PCA: power calibration area) for intensity compensation for optical beams in the event of recording of information on the optical disk 100, and an area (RMA: recording management area) use to record recording management information necessary for a data recording and playback apparatus 200.

The first read-in area 114 contains items of preliminarily recorded information, that is, identification information of the optical disk 100; substrate information indicating that the date recording layer is formed on the surface of the optical disk 100 to be irradiated by the laser light; address management information regarding the address used to specify the data area 115; and other information such as management information regarding the copyright protection of the recorded contents data.

In the first read-in area 114, the data area 115, and the read-out area 116, a groove-shaped tracks ("groove tracks", hereafter) for recording data, and tracks ("land tracks", hereafter) having a different height from the groove tracks each interposed between the groove tracks are formed. The groove tracks and the land tracks are spirally formed adjacent to one another from the inner periphery side to the outer periphery side.

In the respective areas, the groove tracks are formed of grooves each called a "wobble" meandering at a certain cycle (the groove hereafter will be referred to as a "groove wobble"). In these areas, there are stored ether signals for tracking of an optical pickup 201 and signals for rotation control of the optical disk 100, or information such as pre-pit detection gate signals to be used for playback control or recording control of the optical disk 100 in the data playback apparatus in the event of playing back the contents data in accordance with the wobble signals occurred by the groove wobbles.

Further, in these areas, there are sequentially recorded respective items of data, such as the contents data, in the direction from of the inner periphery side to the outer periphery side.

On the land tracks formed in the respective areas, there are regularly prestored pits containing address information indicative of the positions in the optical disk 100 (the pits hereafter will be referred to as "land pre-pits"), and pits indicative that the second substrate 120 has a visual information area 123 for recording the visual information.

In or on the visual information recording layer provided on the second substrate 120, there are formed, in order from the inner periphery side, the clamp hole 111, a second non-recording area 121 for the fixation, a second read-in area 122 for recording management information for being used to manage records in the event of recording of the visual information and a visual information area 123 for recording the visual information.

For example, the second read-in area 122 of the present embodiment saves as a visual information management area of the present invention.

More specifically, in the second read-in area 122, there are recorded items of information which follow, in addition to the identification information of the optical disk 100. The items of information are substrate information indicative that the visual information recording layer is formed on the surface of the optical disk 100 to be irradiated with the laser light; address management information regarding the address specifying the visual information area 123; and visual information management information for being used to determine whether or not visual information is already recorded. Further, in the second read-in area 122, there is recorded visual-information contents information that is indicative of the contents of visual information after the visual information has been recorded and that is indicative of information of an address at which the visual information has been recorded.

In the visual information area 123, there is recorded visual information to be visually transferred to a user, and data that, even when data in that portion is read by the pickup 201, does not constitute data having significance as contents data.

Figure 3A:
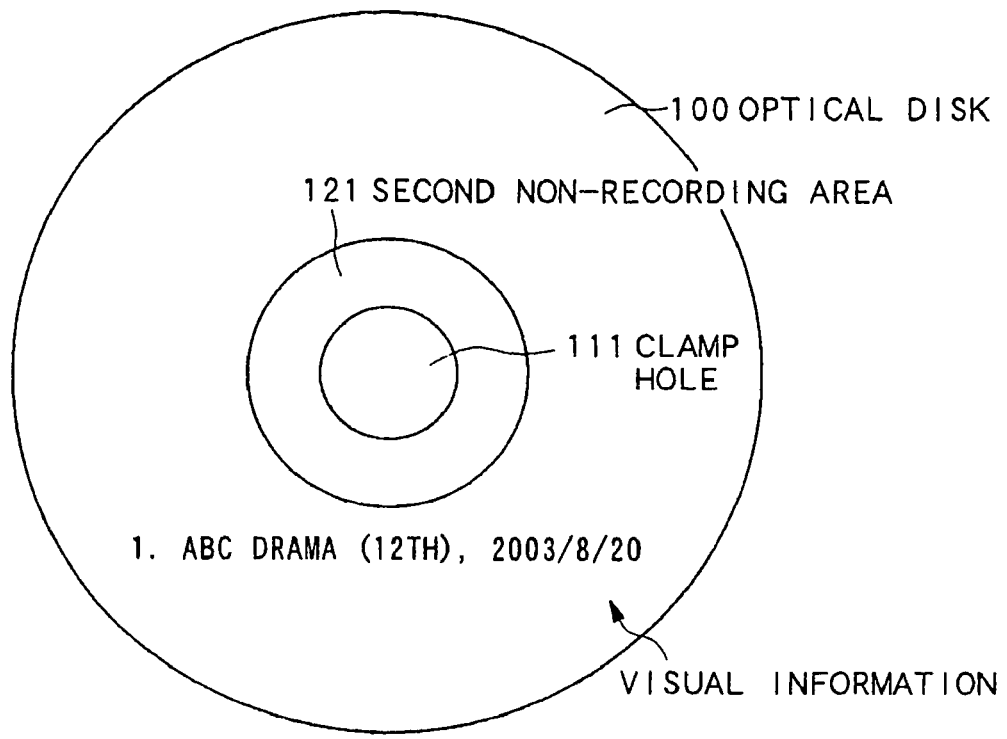
FIG. 3 is one example of an optical disk when visual information is recorded thereon in the first embodiment.
Figure 3B:
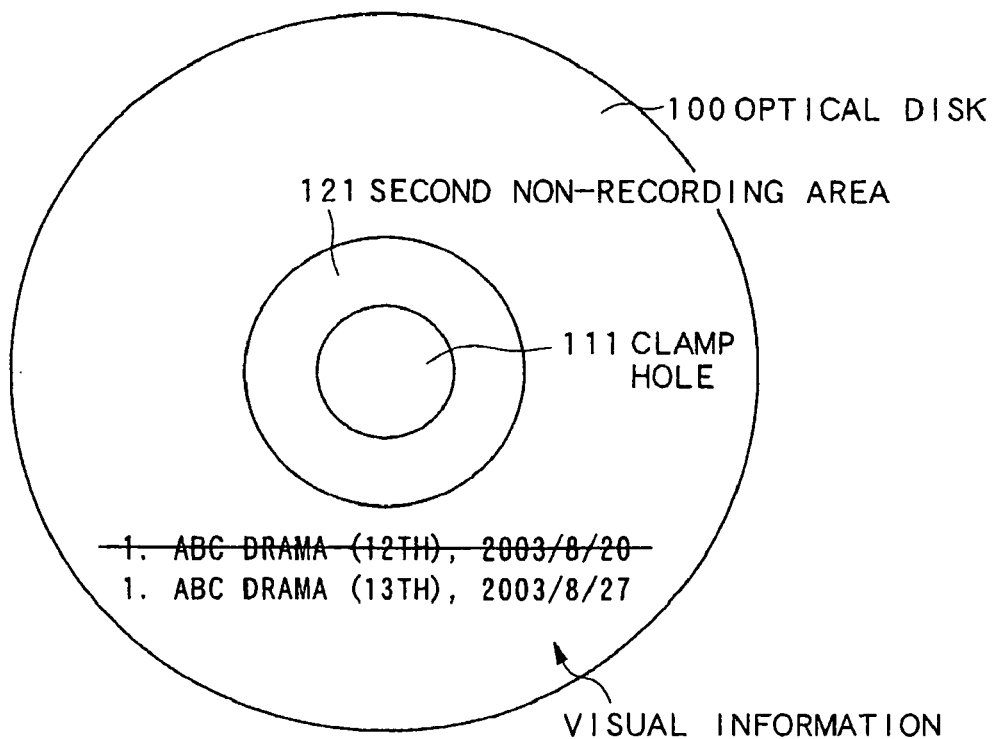

For instance, suppose that, as shown in FIGS. 3A and 3B, contents data of a 12th series version of a drama—drama title "ABC", broadcast date "2003/8/20" or a 13th series version of the drama, broadcast date 2003/8/27, is stored in the data area 115. In this case, visual information indicative of the contents of the contents data is recorded onto the visual information recording layer.

In more specific, FIG. 3B shows a recordable optical disk 100, such as a DVD-R, in which the visual information is indicated in the event that contents data of the 13th series version of the "ABC" drama is recorded after contents data of the 12 series version of the "ABC" drama is recorded.

As shown in FIG. 3B, in the case that the contents data of the 13th series version of the "ABC" drama additionally written into the optical disk 100 and the contents data of the 12th series version of the "ABC" drama is unnecessary, the visual information thereof can be added with a cancellation line being added on. In this case, the contents data of the 12th series version of the "ABC" drama is physically undeletable because the medium is the recordable optical disk 100. However, management is carried out in accordance with contents management information and other information recorded in the first read-in area 114 so that the contents data is virtually deleted, that is, the contents data is inhibited from being read out.

In addition, as described further below, according to the present embodiment, when the data recording and playback apparatus 200 has read out the visual-information contents information, the data recording and playback apparatus 200 is able to acquire, as information, the structure of the visual information stored in the optical disk 100.

Similarly as in the first substrate 110, in the second read-in area 122 and the visual information area 123, groove-shaped groove tracks for recording data and land tracks each interposed between the groove tracks are formed, and the groove tracks and the land tracks spirally formed adjacent to one another from the inner periphery side to the outer periphery side.

Similarly as in the first substrate 110, in the second read-in area 122, data is sequentially recorded onto the groove tracks from the inner periphery side; however, as described further below, in the visual information area 123, visual information is randomly recorded onto the respective groove tracks and land tracks.

Figure 4:
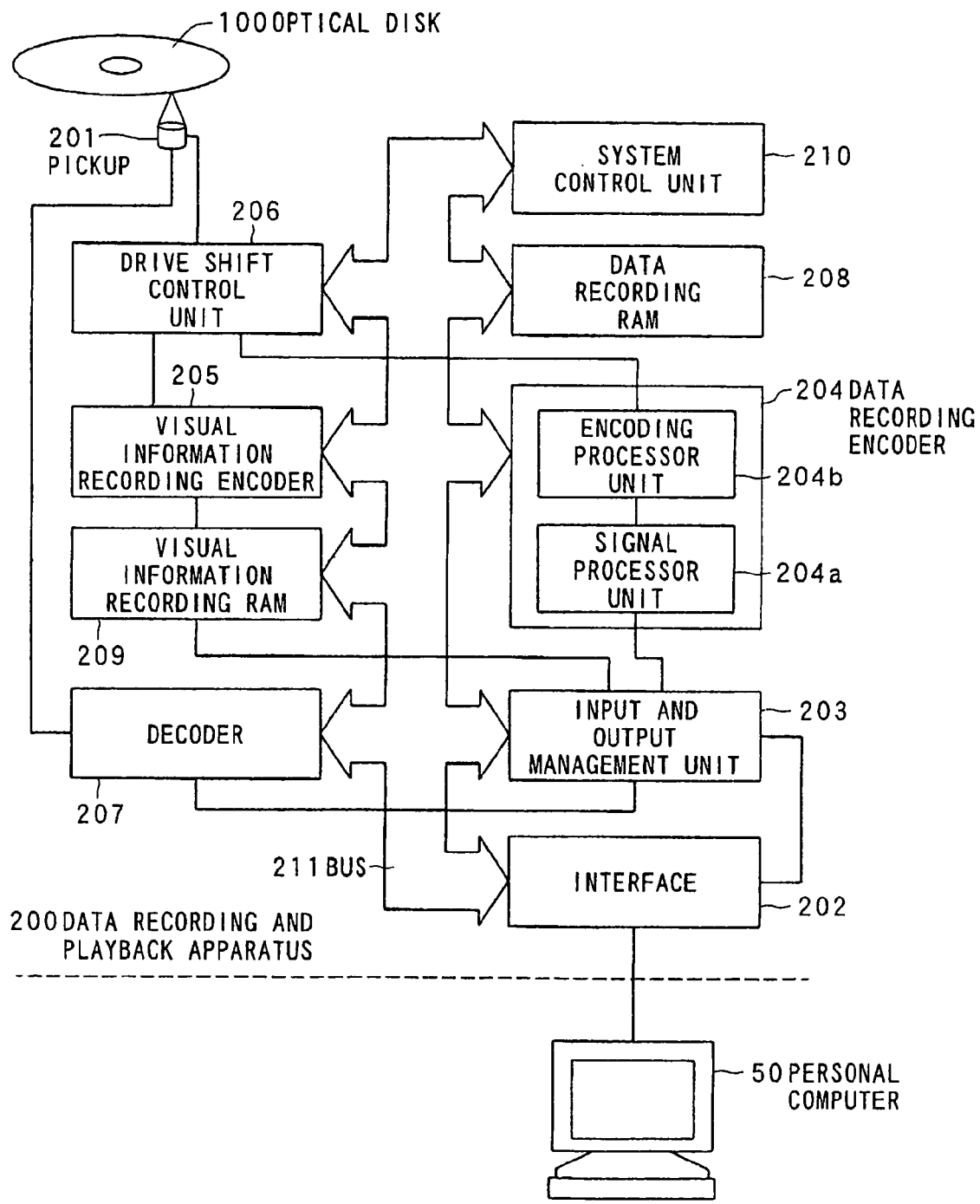
FIG. 4 is a block diagram showing the configuration of a data recording and playback apparatus that records contents data and visual information onto the optical disk of the first embodiment according to the present invention.

With reference to FIG. 4, the data recording and playback apparatus for recording contents data and visual information onto the optical disk will be described hereinbelow.

FIG. 4 is a block diagram showing the configuration of the data recording and playback apparatus that records contents data and visual information onto the optical disk of the present embodiment.

With reference to FIG. 4, either contents data or visual information output from a personal computer 50 connected as an external device inputs into the data recording and playback apparatus 200. The data recording and playback apparatus 200 records the received contents data or visual information onto the optical disk 100.

In the present embodiment, contents data and visual information to be recorded are generated by an application program running in the personal computer 50. The data recording and playback apparatus 200 records onto the optical disk 100 the contents data and visual information thus generated as data to be recorded.

More specifically, the data recording and playback apparatus 200 is configured to include the pickup 201 that activates a semiconductor laser in accordance with the received contents data or visual information. In this configuration, the pickup 201 is used to irradiate a laser beam on either the data recording layer or visual information recording layer of the optical disk 100. With the laser beam irradiated on the optical disk 100, recording and playback of the contents data and recording of visual information are performed on the optical disk 100.

The data recording and playback apparatus 200 is connected to external devices, such as the personal computer 50, and is configured to include an interface 202 that is used for either input and output of contents data or input of visual information; an input and output management unit 203 that manages contents data and visual information; a data recording encoder 204 that encodes the received contents data into a predetermined format for recording the data on the optical disk 100; a visual information recording encoder 205 that converts the received visual information into a predetermined format for recording the information onto the optical disk 100; a drive shift control unit 206 that shifts a drive waveform of the pickup 201; a decoder 207 that decodes a signal read out by the pickup 201 into a predetermined format; a data recording RAM 208 that is used either to record or to read out contents data; a visual information recording RAM 209 that is used to record visual information; and a system control unit 210 that totally controls the respective component units described above while performing supply and/or reception of necessary control information through a bus 211. The respective units are connected to one another via the bus 211.

For example, in the present embodiment, the data recording encoder 204 serves as contents-data dedicated drive signal generating device of the present invention, and the visual information recording encoder 205 serves as visual-information dedicated drive signal generating device of the present invention.

In addition, for example, in the present embodiment, the drive shift control unit 206 serves as selecting device of the present invention, and the system control unit 210 serves as detecting device and determining device of the present invention.

When recording contents data and visual information onto the optical disk 100, the pickup 201 operates in accordance with a modulated signal generated by the data recording encoder 204 and the visual information recording encoder 205.

More specifically, in accordance with the modulated signal generated by the data recording encoder 204 and the visual information recording encoder 205, the pickup 201 causes activation of the semiconductor laser (not shown) provided in the pickup 201, and causes emanation of a laser beam to the optical disk 100. The laser beam varies in intensity corresponding to information being recorded.

In addition, the pickup 201 emanates a laser beam of a fixed intensity for playback, receives reflected light thereof through a light receiver unit (not shown), generates a detection signal variable corresponding to intensity variation of reflected light, and outputs the generated detection signal to the decoder 207.

The interface 202 receives either contents data having a predetermined format or visual information from the outside. The interface 202 converts the received contents data or visual information into a predetermined format and then outputs them to the input and output management unit 203.

In addition, contents data read out by the pickup 201 from the optical disk 100 is input from the input and output management unit 203 into the interface 202. In accordance with an instruction of the system control unit 210, the interface 202 outputs the contents data to the personal computer 50 connected to the outside through the interface 202.

The input and output management unit 203 receives either the contents data or visual information converted by the interface 202 into the predetermined format. In accordance with an instruction of the system control unit 210, the input and output management unit 203 uses the data recording RAM 208 to output the contents data to the data recording encoder 204 and to output the visual information to the visual information recording encoder 205.

In addition, the input and output management unit 203 receives contents data decoded by the decoder 207 and read out from the optical disk 100. Similarly as in the case of input of the contents data, the input and output management unit 203 uses the data recording RAM 208 to output the contents data, which has been output from the decoder 207, to the personal computer 50 connected to the outside through the interface 202.

More specifically, while temporarily storing received contents data into the data recording RAM 208, the input and output management unit 203 reads out contents data from the data recording RAM 208 with a predetermined timing, and outputs the contents data to either the data recording encoder 204 or the interface 202.

In addition, similarly as in the case of the contents data, while temporarily storing the output visual information into the visual information recording RAM 209, the input and output management unit 203 reads out visual information from the visual information recording RAM 209 with a predetermined timing, and outputs the visual information to the visual information recording encoder 205.

The data recording encoder 204 receives contents data through the input and output management unit 203. In accordance with an instruction of the system control unit 210, the data recording encoder 204 performs a predetermined process on received contents data, generates modulated signal for use in writing onto the optical disk 100, and outputs the generated modulated signal to the drive shift control unit 206.

More specifically, the data recording encoder 204 includes a signal processor unit 204*a* that performs error correction encoding of the received contents data and that adds an error correction signal of, for example, an ECC (Error Correction Code) block; and encoding processor unit 204*b* that performs an 8/16 modulation (Eight to Fourteen Modulation) of the contents data added with the error correction signal, in accordance with predetermined encoding rules or standards, thereby to generate a modulated signal.

The visual information recording encoder 205 receives visual information output from the input and output management unit 203 through the visual information recording RAM 209. In accordance with an instruction of the system control unit 210, the visual information recording encoder 205 performs a predetermined process on the received visual information to thereby generate a modulated signal for use in writing onto the optical disk 100, and outputs the generated modulated signal to the drive shift control unit 206.

More specifically, the visual information recording encoder 205 acquires visual information once written from the visual information recording RAM 209, and generates a modulated signal for adjusting from the laser beam intensity corresponding to the contrast in accordance with the acquired visual information.

In addition, in accordance with an address on the optical disk 100 acquired by the decoder 207 described further below, the visual information recording encoder 205 determines a recording position, i.e., an address, of the modulated signal generated through the system control unit 210, and outputs the modulated signal generated in accordance with the determined address.

Further, after recording of the visual information, the visual information recording encoder 205 controls the pickup 201 to write address information of the recorded area, i.e., the range having recorded visual information, in the second read-in area 122. Concurrently, the encoder 205 generates a modulated signal corresponding to the address information and outputs the information to the drive shift control unit 206.

The drive shift control unit 206 receives the modulated signals output from the data recording encoder 204 and the visual information recording encoder 205. In accordance with an instruction of the system control unit 210, the drive shift control unit 206 selects any one of the received modulated signals, and outputs the selected modulated signal to the pickup 201.

More specifically, the drive shift control unit 206 selects the modulated signal output from the data recording encoder 204 in the event of recording of contents data onto the optical disk 100, and selects the modulated signal output from the visual information recording encoder 205 in the event of recording of visual information onto the optical disk 100, and outputs the selected modulated signal to the optical pickup 201.

The decoder 207 receives the detection signal detected by the pickup 201. The decoder 207 performs predetermined processes, such as preset amplification process and waveform shaping process, on the detected detection signal. In addition, the decoder performs a preset demodulation process, thereby to generate various types of information, such as identification information of the optical disk 100, visual information management information, substrate information and address management information recorded in the respective read-in areas; contents data; and address information recorded in the land pre-pits.

In addition, the decoder 207 outputs the various types of generated information to either the input and output management unit 203 or the system control unit 210.

The system control unit 210 is, primarily, configured to include a central processing unit ("CPU", hereafter) and memory, and totally controls the data recording and playback apparatus 200 in accordance with instructions of the personal computer 50 connected to the outside. In more specific, the system control unit 210 controls the respective units in the event of recording either contents data or visual information, and the respective units in the event of recording of contents data and playback thereof.

As described above, according to the present embodiment, the contents data and visual information to be recorded are generated by the application program running in the personal computer 50. In accordance with the instructions of the personal computer 50 input through the bus 211 and the like, the system control unit 210 controls the respective units, and records onto the optical disk 100 contents data and visual information generated as data to be recorded.

In addition, in the event of recording of contents data or playback thereof and in the event of recording of visual information, the system control unit 210 acquires, through the pickup 201 and the decoder 207, identification information of the optical disk 100, visual information management information, various types of information such as substrate information and address management information, and predetermined information such as visual information management information recorded in the first read-in area 114 and the second read-in area 122; and address information recorded in the land pre-pits.

Especially, as described further below, in the event of an initial operation of recording visual information, the system control unit 210 acquires predetermined information in either the first read-in area 114 or the second read-in area 122, possibility or impossibility of recording visual information onto the substrate irradiated with the laser beam, and the recording position in the visual information area 123. In addition, while acquiring address information stored in the land pre-pits in the event of recording of the visual information onto the optical disk 100, the system control unit 210 records the visual information onto the optical disk 100 in accordance with the address information and the other information.

More specifically, in the event of a rewritable optical disk 100, such as a DVD-RW device, in accordance with the acquired address recorded onto the optical disk 100, the system control unit 210 causes the intensity of the laser beam to be adjusted by the pickup 201, and concurrently controls the pickup to irradiate the laser beam onto the optical disk 100 and to record the visual information thereon.

Similarly, also when rewriting visual information onto the rewritable optical disk 100 on which visual information has already been recorded, the system control unit 100 erases the visual information recorded with the laser beam, and concurrently records the new visual information.

Alternatively, in the event of a recordable optical disk 100, such as a DVD-R device, in accordance with an acquired address recorded onto the optical disk 100, the system control unit 210 causes the laser beam emanated from the pickup 201 to irradiate only on the visual information area 123 corresponding to the address portion to be irradiated, thereby causing the visual information to be recorded.

In the event that adding the visual information to the optical disk 100 on which visual information has already been recorded, the system control unit 100 operates in accordance with visual information management information so that an unirradiated address portion is recognized, as shown in FIG. 3B, the unirradiated address portion is irradiated, and visual information management information in the recorded visual information is added to the already recorded visual information management information, whereby additional writing is carried out.

In addition, in accordance with the visual information management information, the system control unit 210 forms the structure of visual information recorded onto the optical disk 100, that is, a record pattern of the recorded visual information, and outputs the formed record pattern of the visual information to an external device, such as the connected personal computer 50.

More specifically, in the event that visual information has been recorded with visual information management information, the system control unit 210 acquires an address at which the laser beam has been irradiated, and forms the record pattern of the visual information in accordance with the acquired address.

Details of recording processes for visual information in the system control unit 210 of the present embodiment will be described below.

Operation of the recording processes for visual information in the system control unit will be described with reference to FIGS. 5 and 6.

Figure 5:
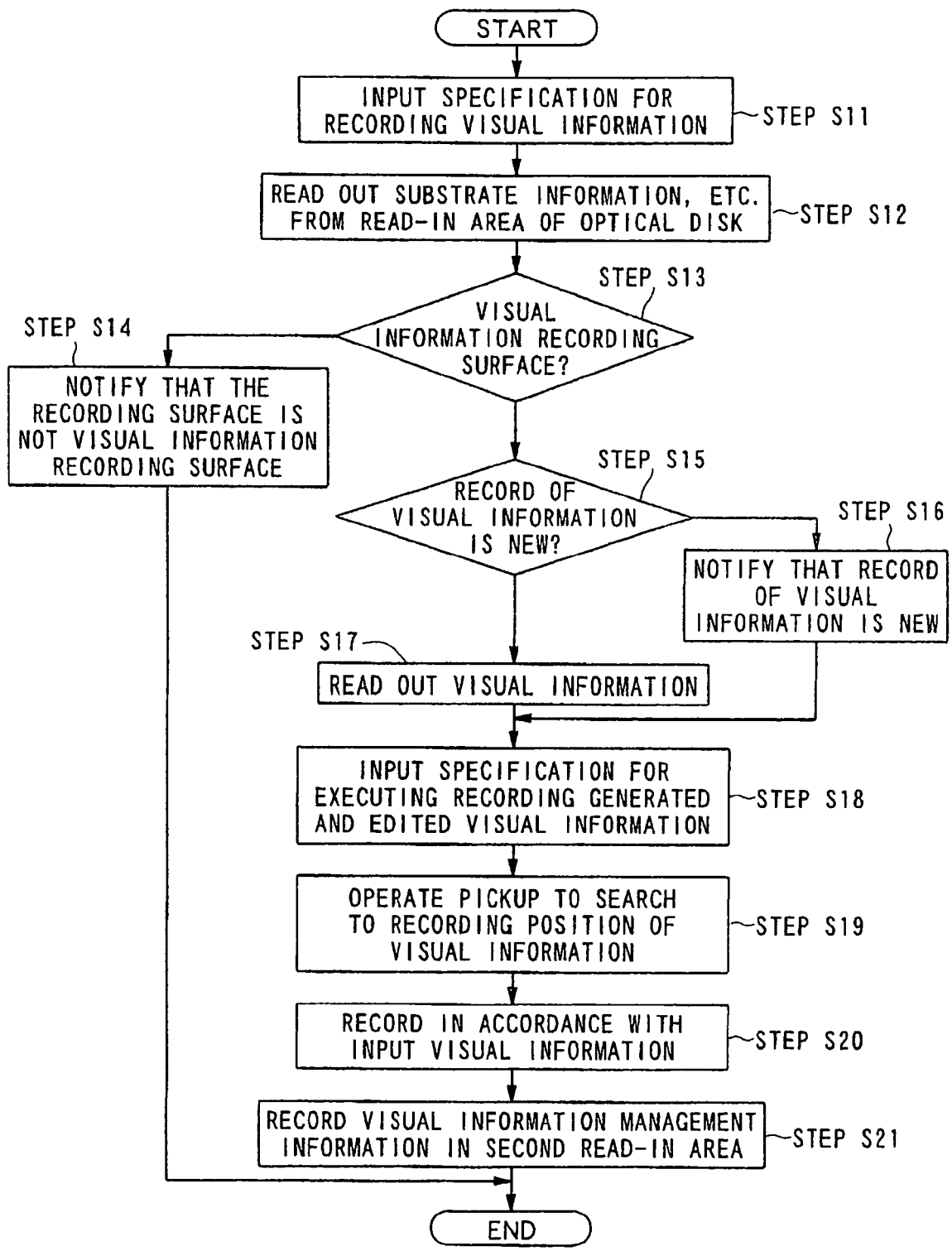
FIG. 5 is a flowchart showing a recording process of a system control unit for visual information in a rewritable optical disk of the first embodiment.

FIG. 5 is a flowchart showing a recording process of the system control unit for visual information in a rewritable optical disk. FIG. 6 is a flow chart showing a recording process of the system control unit for visual information in a recordable optical disk.

The operation of the recording processes will be described separately in the event of a rewritable optical disk such as a DVD-RW device allowing overwrite of data and in the event of a recordable optical disk such as a DVD-R device allowing only one-time recording or additional writing thereto.

For the operation, the case is now assumed such that the optical disk 100 for recording the visual information is already set on the data recording and playback apparatus 200. Concurrently, the identification between the rewritable optical disk 100 and the recordable optical disk 100 are already performed in accordance with various types of information stored in either the first read-in area 114 or the second read-in area 122.

(Rewritable Optical Disk)

With reference to FIG. 5, with an application program being activated, in system control unit 210, input is carried out specifying to record visual information output from the personal computer 50 onto the rewritable disk (step S11). Responsively, the system control unit 210 controls the pickup 201, thereby reading out various types of information. They are, for example, substrate information, address management information, and visual information management information, if recorded, from either one of the first read-in area 114 and second read-in area 122 of the optical disk 100, that is, from a read-in area existing on the surface readable by the pickup 201 (step S12).

More specifically, the system control unit 210 drives a drive unit (not shown) of the pickup, thereby causing the pickup 201 to search the read-in area. In addition, the system control unit controls a spindle motor (not shown) to rotate the rewritable optical disk 100, thereby causing the pickup 201 to read out the various types of information recorded in the read-in area, whereby to acquire the read out the various types of information through the decoder 207.

Subsequently, the system control unit 210 determines in accordance with the acquired substrate information whether or not the surface of the optical disk 100 recordable by the pickup 201 is a visual information recording surface (step S13).

If having determined that the surface recordable by the pickup 201 is the data recording surface, the system control unit 210 sends a notification to that effect to the personal computer 50 (step S14), and then terminates the operation.

In this event, if the personal computer 50 has received a notification to the effect that the surface recordable by the pickup 201 is the data recording surface, since the visual information cannot be recorded onto the data recording surface, the personal computer 50 notifies the user to that effect through a display or speaker connected to the personal computer 50.

Alternately, if having determined that the surface recordable by the pickup 201 is the visual information recording surface, then the system control unit 210 determines in accordance with the acquired visual information management information whether or not visual information has already been recorded on the optical disk 100 (step S15).

If having determined that visual information has not yet been recorded on the optical disk 100, then the system control unit 210 outputs a notification to that effect to the personal computer 50, and awaits input of visual information to be recorded (step S16).

Alternatively, if having determined that visual information has already been recorded on the optical disk 100, then the system control unit 210 reads out the visual information, outputs the read out visual information with a notification to that effect to the personal computer 50, and awaits input of visual information to be recorded (step S17).

More specifically, if having determined that visual information has already been recorded on the optical disk 100, then the system control unit 210 controls the pickup 201, thereby to cause visual information management information recorded in the second read-in area 122 to be read. Then, the system control unit causes a record pattern of the visual information to be formed in accordance with the readout visual information management information, and causes the formed visual information to be output to the computer.

If, at steps S16 and S17, having received the notification to the effect that visual information is not yet recorded on the optical disk 100 set on the data recording and playback apparatus 200, then the personal computer 50 displays a whole surface of a new optical disk 100 in accordance with the application program. Alternatively, if having received the notification to the effect that visual information has already been recorded on the optical disk 100 set on the data recording and playback apparatus 200, the personal computer 50 displays a record pattern of the received visual information, that is, a formed record pattern of the visual information, in accordance with the application program.

Subsequently, the visual information being recorded on the optical disk 100 is edited or generated by the personal computer 50, and input is carried out to specify execution of recording of the visual information onto the optical disk 100 (step S18). Then, the system control unit 210 controls the drive shift control unit 206 to shift a signal input of the pickup 201 to the visual information recording encoder 205. In addition, the system control unit controls the drive unit (not shown) of the pickup 201 to search the surface to the recording position of the visual information, that is, to the innermost peripheral position of the visual information area 123 (step S19).

Subsequently, when visual information to be recorded is input into the data recording and playback apparatus 200 from the personal computer 50, then the visual information to be recorded is input into the visual information recording encoder 205 through the input and output management unit 203 and the visual information recording RAM 209. Then, the visual information recording encoder 205 controls the pickup 201 in accordance with the received visual information, thereby recording the received visual information onto the optical disk 100 (step S20).

More specifically, the input and output management unit 203 outputs the received visual information to the visual information recording RAM 209 through the interface 202. Concurrently, the visual information recording encoder 205 generates a modulated signal from the visual information received through the visual information recording RAM 209.

In addition, while determining address information in accordance with the received visual information and controlling the position of the pickup 201 through the system control unit 210 in accordance with the determined address information and the address on the optical disk 100 for recording the visual information read out by the decoder 207, the visual information recording encoder 205 outputs the modulated signal to the pickup 201.

Finally, when input is carried out from the personal computer 50 to specify termination of recording of visual information, then the system control unit 210 causes the visual information recording encoder 205 to generate visual information management information, and causes the generated visual information management information to be recorded through the pickup 201 in a predetermined area of the second read-in area 122 (step S21).

More specifically, the system control unit 210 causes the address irradiated or not irradiated with the laser beam to be overwritten to the second read-in area 122 as visual information management information in the formed visual information.

(Recordable Optical Disk)

Figure 6:
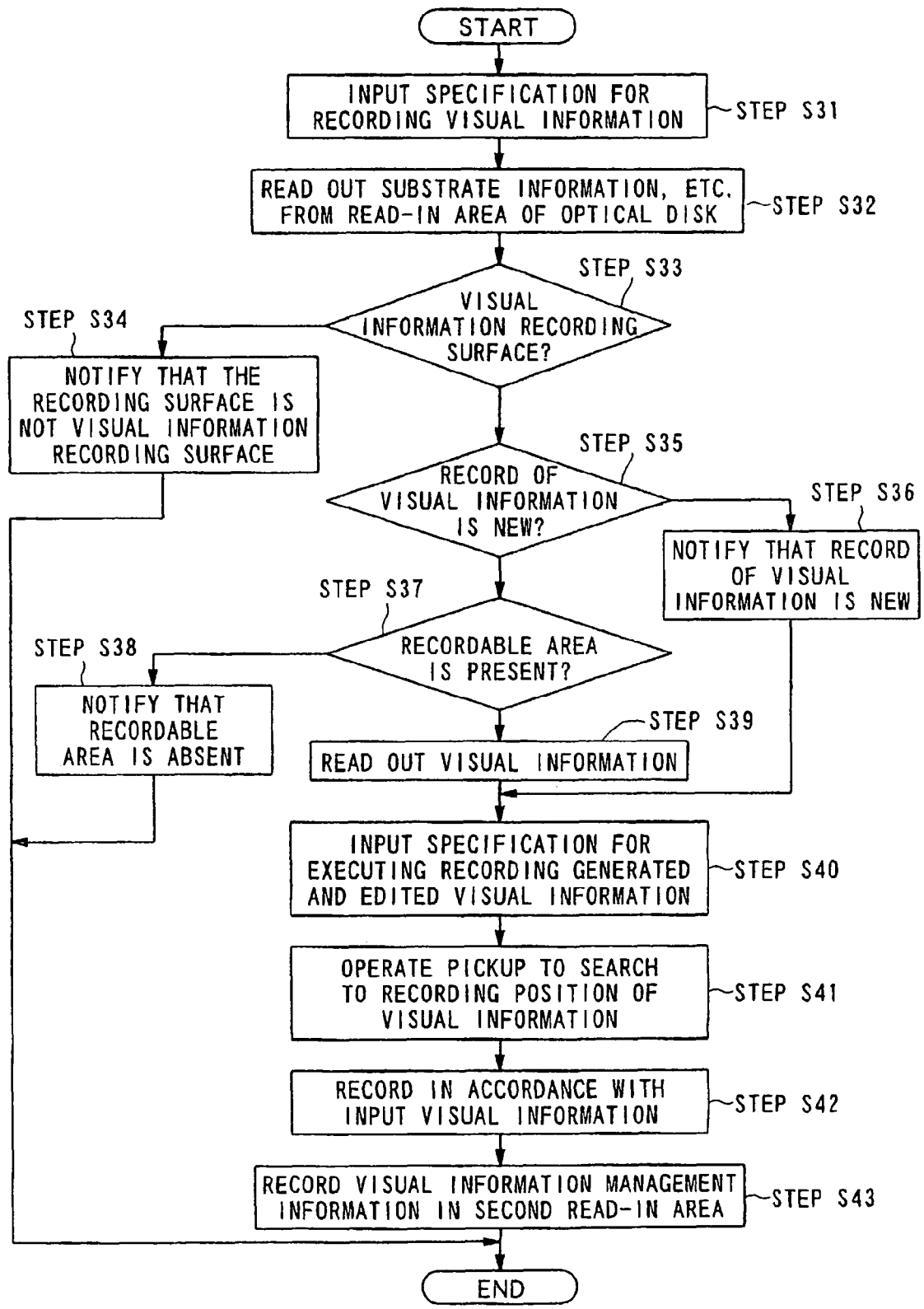
FIG. 6 is a flowchart showing a recording process of the system control unit for visual information in a recordable optical disk of the first embodiment.

With reference to FIG. 6, with an application program being activated, in system control unit 210, input is carried out specifying to record visual information output from the personal computer 50 onto the recordable disk (step S31). Responsively, the system control unit 210 reads out various types of information, such as substrate information, from either one of the first read-in area 114 and second read-in area 122 of the optical disk 100 (step S32).

Subsequently, the system control unit 210 determines in accordance with the acquired substrate information whether or not the surface of the optical disk 100 recordable by the pickup 201 is a visual information recording surface (step S33).

If having determined that the surface recordable by the pickup 201 is the data recording surface, the system control unit 210 sends a notification to that effect to the personal computer 50 (step S34), and then terminates the operation.

Alternately, if having determined that the surface recordable by the pickup 201 is the visual information recording surface, then the system control unit 210 determines in accordance with the acquired visual information management information whether or not visual information has already been recorded on the optical disk 100 (step S35).

If having determined that visual information is not yet recorded on the optical disk 100, then the system control unit 210 outputs a notification to that effect to the personal computer 50, and awaits input of visual information to be recorded (step S36).

Alternatively, if having determined that visual information has already been recorded on the optical disk 100, then the system control unit 210 determines in accordance with the acquired visual information management information the presence or absence of a recordable area (step S37). If having determined that the recordable area is not present, the system control unit 210 outputs a notification to that effect to the personal computer 50 (step S38), and terminates the operation.

In this event, if the personal computer 50 has received a notification to the effect that there is no recordable area for recording the visual information in the visual information area 123, since the visual information cannot be recorded onto the data recording surface, the personal computer 50 notifies the user to that effect through a display or speaker connected to the personal computer 50.

Alternately, if having determined that the recordable visual information area 123 is present, then the system control unit 210 reads out the recorded visual information, outputs the visual information with a notification to that effect to the personal computer 50, and awaits input of visual information to be recorded (step S39).

More specifically, if having determined that visual information has already been recorded on the optical disk 100, then, similarly as in the case of the rewritable optical disk 100, the system control unit 210 controls the pickup 201, thereby to cause readout of newest visual information management information recorded in the second read-in area 122. Then, the system control unit 210 causes visual information to be formed in accordance with the read out visual information management information, and causes the formed visual information to be output to the computer.

If, at steps S36-S39, having received the notification to the effect that visual information is not yet recorded on the optical disk 100 set on the data recording and playback apparatus 200, then the personal computer 50 displays a disk surface of a new optical disk 100 in accordance with the application program. Alternatively, if having received the notification to the effect that visual information has already been recorded on the optical disk 100 set on the data recording and playback apparatus 200, then the personal computer 50 displays a record pattern of the received visual information, that is, a formed record pattern of the visual information, in accordance with the application program.

Subsequently, the visual information being recorded on the optical disk 100 is edited or generated by the personal computer 50, and input is carried out to the system control unit 210 to specify execution of recording of the visual information onto the optical disk 100 (step S40). Then, the system control unit 210 controls the drive shift control unit 206 to shift a signal input of the pickup 201 to the visual information recording encoder 205. In addition, the system control unit controls the drive unit (not shown) of the pickup 201 to search the surface to the recording position of the visual information (step S41).

Subsequently, when visual information to be recorded is input into the data recording and playback apparatus 200 from the personal computer 50, then the visual information to be recorded is input into the visual information recording encoder 205 through the interface 202, the input and output management unit 203 and the visual information recording RAM 209. Then, the visual information recording encoder 205 controls the pickup 201 in accordance with the received visual information, thereby recording the received visual information onto the optical disk 100 (step S42).

Finally, when input is carried out from the personal computer 50 to specify termination of recording of visual information, then the system control unit 210 causes the visual information recording encoder 205 to generate visual information management information, and causes the generated visual information management information to be recorded through the pickup 201 in a predetermined area of the second read-in area 122 (step S43).

More specifically, the system control unit 210 causes the address irradiated or not irradiated with the laser beam to be added to the second read-in area 122 as new visual information management information in the formed visual information.

Thus, according to the present embodiment, the optical disk 100 includes the data recording layer on which contents data is recorded by irradiation of the laser beam, and the visual information recording layer on which the visual information which is visually recognized and indicative of information regarding the contents data is recorded by irradiation of the laser beam. The data recording layer and the visual information recording layer are laminated.

With this structure, according to the present embodiment, when the visual information is recorded to be visually recognized from the surface different from the data recording surface through which the data recording layer is irradiated with the laser beam, identifiable and visual information can easily and accurately be formed in units of the optical disk 100.

Accordingly the management can easily be done for a plurality of optical disks 100 that each enable characters, symbols, and/or other markings to be easily and accurately indicated, compared to the case of handwriting characters, symbols, and/or other markings indicative of the contents of the contents data.

Further, according to the present embodiment, in the case that the structure is thus formed to include the data recording layer and visual information recording layer respectively provided by being laminated, the structure is the same as that of the conventional optical disk 100. The optical disk 100 of the present embodiment, therefore, can be manufactured by a manufacturing method for the conventional optical disk 100, so that the manufacturing cost for the optical disk 100 can be reduced, and low cost optical disks 100 can be provided.

Further, according to the present embodiment, the optical disk 100 is structured such that, the visual information is recorded onto the visual information recording layer by irradiation of the laser beam, which is visually recognized from the surface different from the data recording surface through which the data recording layer is irradiated with the laser beam.

With this structure, according to the present embodiment, the visual information can be indicated onto the different surface of the data recording surface, that is the surface on which the contents data is not recorded, for example, in the case that the contents data is recorded only onto a single surface. As such, when managing a plurality of optical disks 100, the optical disks 100 can be accurately identified from one another, therefore making it possible to improve the usability for users.

According to the present embodiment, the structure is formed such that the visual information is recorded onto the visual information recording layer by irradiation of the laser beam from the surface different from the data recording surface.

With such a structure, in the present embodiment, the visual information is recorded by irradiation of the laser beam from the surface different from the data recording surface. Accordingly, when the contents data is recorded only onto the single surface, for instance, the visual information is indicated on the surface onto which the contents data is not recorded. As such, when managing a plurality of optical disks 100, the optical disks 100 can be accurately identified from one another, consequently making it possible to improve the usability for users.

Further, according to the present embodiment, the optical disk 100 has the structure in which the data recording layer is provided on the first substrate 110 and the visual information area 123 is provided on the second substrate 120, so that the structure is the same as that of the conventional optical disk 100. The optical disk 100 of the present embodiment, therefore, can be manufactured by the manufacturing method for the conventional optical disk 100. Consequently, the manufacturing cost for the optical disk 100 can be reduced, and low cost optical disks 100 can be provided.

Further, according to the present embodiment, on the visual information recording layer there are provided the visual information area 123 for recording the visual information; and the second read-in area 122 in which the substrate information indicative of the visual information recording layer, the visual information management information indicative of the presence or absence of the record of the visual information, and the address management information indicative of the recordable area for visual information are recorded.

With this structure, in the present embodiment, readout of the various types of data recorded in the second read-in area 122 makes it possible to determine the possibility/impossibility of recording onto the optical disk 100 currently being irradiated with the laser beam, the propriety of the visual information recording surface on the surface of the optical disk 100, and the area on which visual information can be recorded. Consequently, visual information can be accurately and easily recorded onto the optical disk 100.

Further, according to the present embodiment, the structure is formed such that, the visual information area 123 in which the substrate information indicative that the visual information recording layer is regularly recorded is provided on the visual information recording layer.

With this structure, in the present embodiment, even when the visual information area 123 has been searched by the pickup 201, it is possible to recognize that the optical disk 100 is provided with the visual information area 123.

Further, according to the present embodiment, on the data recording layer are provided the data recording area for recording the contents data; the first read-in area 114 in which at least one of the recording layer information indicative that the recording layer is the corresponding data recording layer, and recording medium information indicative that the visual information recording layer is provided on the optical recording medium.

According to the present embodiment, with the structure described immediately above, readout of the various types of data information recorded in the first read-in area makes it possible to determine the possibility/impossibility of recording visual information onto the optical disk 100 currently being irradiated with the laser beam and the propriety of the visual information recording surface on the surface of the optical disk 100. Consequently, visual information can be accurately and easily recorded onto the optical disk 100.

Further, according to the present embodiment, the data recording and playback apparatus 200 has the configuration that records visual information onto an optical disk 100 formed by lamination of the data recording layer onto which the contents data is recorded, and a visual information recording layer on which visual information which is visually recognized and indicative of information regarding the contents of the contents data is recorded. The configuration includes the interface 202 that receives visual information to be recorded; the pickup 201 that is used to record the received visual information; and the visual information recording encoder 205 that generates the visual-information dedicated modulated signal for driving the pickup 201, in accordance with the received visual information. The pickup 201 records the visual information onto the visual information recording layer in accordance with the generated visual-information dedicated modulated signal.

With this configuration, in the present embodiment, the modulated signal for driving the pickup 201 is generated in accordance with the received visual information, and the visual information is recorded onto the visual information recording layer in accordance with the visual-information dedicated modulated signal.

Accordingly, when the visual information is recorded onto the optical disk 100 to be visually recognized from the surface different from the data recording surface which is the surface through which the data recording layer is irradiated with the laser beam, identifiable and visual information can easily and accurately be formed in units of the optical disk 100.

Consequently, the management can easily be done for a plurality of optical disks 100 that each enable characters, symbols, and/or other markings to be easily and accurately indicated, compared to the case of handwriting of characters, symbols, and/or other markings indicative of the contents of contents data.

Further, according to the present embodiment, when the visual information is recorded onto the optical disk 100 formed to include the data recording layer and visual information recording layer respectively provided by being laminated, the structure is the same as that of the conventional optical disk 100. The visual information, therefore, can be recorded onto the optical disk 100 that can be manufactured by a manufacturing method for the conventional optical disk 100.

Further, in the present embodiment, the configuration includes the data recording encoder 204 that, when the contents data is input into the interface 202 and the interface 202 records the contents data onto the data recording layer, generates a contents-data dedicated modulated signal for driving the pickup 201, in accordance with the received visual information; and the drive shift control unit 206 that selects one of the contents-data dedicated modulated signal and the visual-information dedicated modulated signal generated by the visual information recording encoder 205. When the contents-data dedicated modulated signal is selected, the pickup 201 records the contents data onto the data recording layer in accordance with the contents-data dedicated modulated signal. When the visual-information dedicated modulated signal is selected, the pickup 201 records the visual-information in accordance with the visual-information dedicated modulated signal.

With this configuration, in the present embodiment, when the contents-data dedicated modulated signal is selected, the pickup 201 records the contents data onto the data recording layer in accordance with the contents-data dedicated modulated signal. Alternately, when the visual-information dedicated modulated signal is selected, the pickup 201 records the visual-information in accordance with the visual-information dedicated modulated signal onto the data recording layer.

Accordingly, with the pickup 201, since the contents data and the visual information can be recorded onto the optical disk 100, the data recording and playback apparatus 200 can easily configured, and the data recording and playback apparatus 200 can be provided at low costs.

Further, according to the present embodiment, the configuration includes the system control unit 210. In the case that the optical disk 100 includes a visual information recording layer having at least one of the second read-in area 122 in which the visual information is recorded by irradiation of the optical beam from the surface different from the data recording surface and in which at least substrate information indicative of the corresponding visual information is recorded, and the visual information area 123 in which the visual information and at least substrate information indicative of the corresponding visual information are recorded, the system control unit 210 detects at lest one of the recording layer information recorded in the second read-in area 122 of the visual information recording layer and the recording layer information recorded in the visual information area 123 of the visual information recording layer; and determines an irradiation surface of the optical disk 100 being irradiated with the optical beams in accordance with the detection result.

With this configuration, in the present embodiment, there is detected at lest one of the substrate information recorded in the second read-in area 122 of the visual information recording layer and the substrate information recorded in the visual information area 123, and there is determined an irradiation surface of the optical disk 100 being irradiated with the optical beams.

Accordingly, a surface of the optical disk 100 on which visual information is to be recorded can be accurately and easily verified.

Further, according to the present embodiment, the configuration includes the system control unit 210. In the case that the optical disk 100 includes the visual information recording layer on which visual information is recorded by irradiation of the laser beam from the surface different from the data recording surface, and the data recording layer which is provided with the first read-in area 114 in which substrate information indicative of the corresponding data recording layer is recorded, the system control unit 210 detects the substrate information recorded onto the first read-in area 114 of the data recording layer, and determines a surface of the optical disk 100 being irradiated with the optical beams in accordance with the detection result.

With this configuration, in the present embodiment, there is detected the substrate information recorded in the first read-in area 114 of the data recording layer, and there is determined a surface of the optical disk being irradiated with the optical beams.

Accordingly, a surface of the optical disk 100 on which visual information is to be recorded can be accurately and easily verified.

In the present embodiment, the visual information recording encoder 205 and the data recording encoder 204 are discretely provided. However, the configuration may be such that portions of functions of the encoders are rendered to common, and a shift portion for shifting the signal being input into the pickup 201 is provided in a forestage section where the functions are common, in which the pickup 201 is driven and controlled in accordance with the shifted signal.

Further, in the present embodiment, when recording the visual information onto the optical disk 100, visual information is recorded by irradiation of the laser beam from the surface different from the data recording surface. However, the visual information may be recorded by irradiation of the laser beam from the data recording surface.

In this case, the configuration may be such that the system control unit 210 controls the pickup 201 to shift the focal position of the laser beam, whereby recording of the contents data and recording of the visual information are performed. With this configuration, the operation of turning over the surface of the optical disk 100 itself can be omitted.

Further, in the present embodiment, the light intensity of the laser beam is varied, and the contrast of the visual information recording layer is increased, thereby to record visual information onto the optical disk 100. However, it may be that the film property is changed, and the visual information recording layer changing in dye depending on the intensity of the laser beam is used, whereby the visual information is recorded onto the optical disk 100.

Second Embodiment

A second embodiment of a respective optical disk and data recording and playback apparatus will be described hereinbelow with reference to FIG. 7.

The present embodiment has features in that dedicated pickups are provided for recording the respective contents data and visual information, in lieu of the manner of recording the various types of information onto the optical disk by shifting between contents data and visual information by using the single pickup in the first embodiment. Other respects including the configuration of the data recording and playback apparatus and the configuration of the optical disk are similar to those of the first embodiment. As such, like reference numerals are used to represent like units and/or members, and descriptions thereof are omitted here.

In addition, according to the present embodiment, in the operation of the recording process, the shift operation of the driving waveform by the drive shift control unit 206 of the first embodiment is not necessary, and the first pickup is used to perform the operation of step S12. Further, according to the present embodiment, at step S13 in the first embodiment, the system control unit 210 determines in accordance with substrate information read out by the first pickup 301, whether or not the surface recordable by the first pickup 301 is the data recording surface. The other processes are similar to those in the first embodiment, so that descriptions thereof are omitted here.

Figure 7:
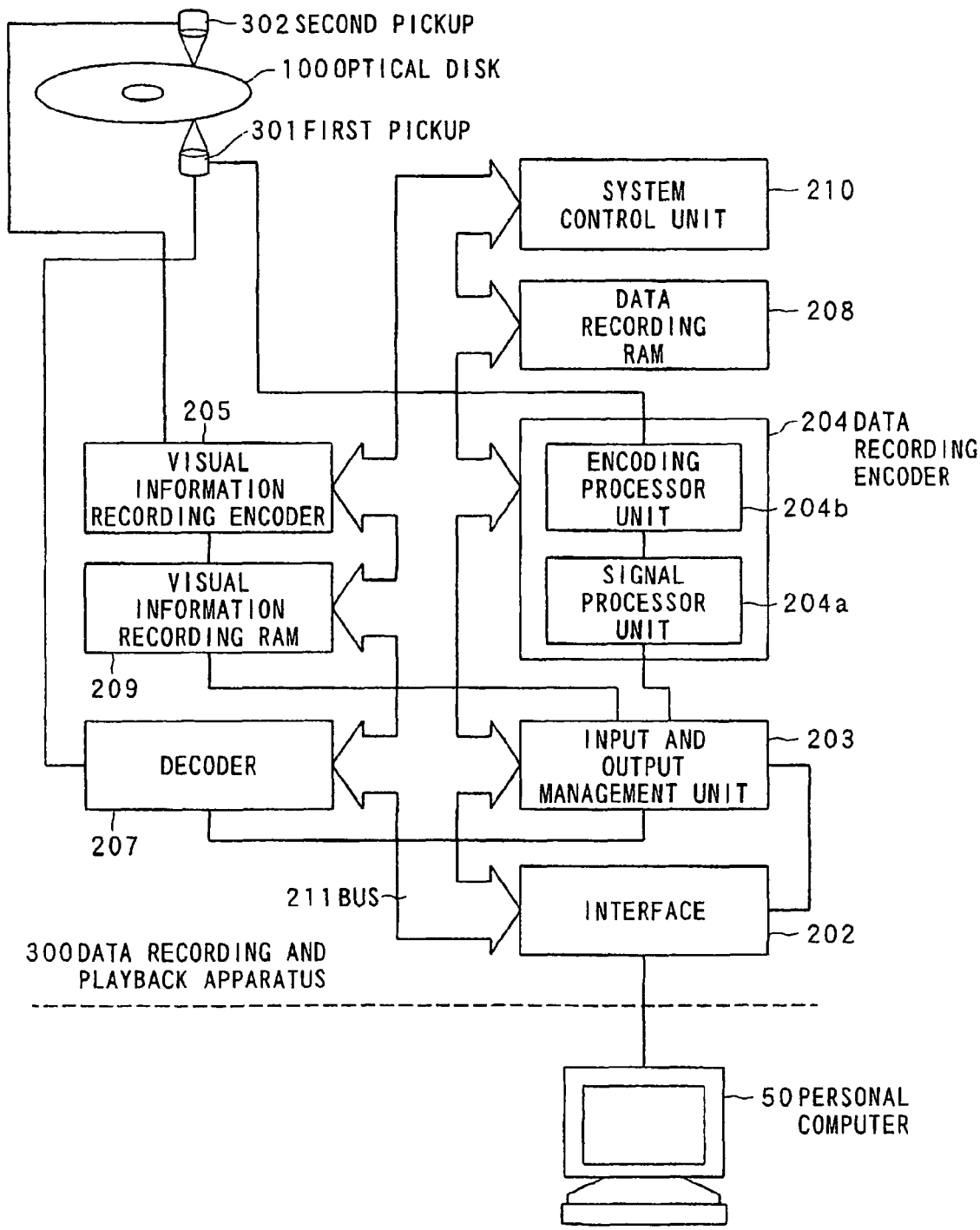
FIG. 7 is a block diagram showing the configuration of a data recording and playback apparatus that records contents data and visual information onto an optical disk of a second embodiment according to the present invention.

With reference to FIG. 7, the data recording and playback apparatus for recording contents data and visual information onto the optical disk will be described hereinbelow.

FIG. 7 is a block diagram showing the configuration of the data recording and playback apparatus that records contents data and visual information onto the optical disk of the present embodiment.

Similarly as in the first embodiment, either contents data or visual information output from the personal computer 50 connected as an external device is input into the data recording and playback apparatus 300. The data recording and playback apparatus 300 records the received contents data or visual information onto the optical disk 100.

The data recording and playback apparatus 300 includes a first pickup 301 that drives a semiconductor laser in accordance with the received contents data, and a second pickup 302 that drives a semiconductor laser in accordance with visual information. The first pickup 301 and the second pickup 302 are used to irradiate the laser beam on either the data recording layer or visual information recording layer of the optical disk 100. With the laser beam thus irradiated on the optical disk 100, recording and playback of the contents data and recording of visual information are performed on the optical disk 100.

As shown in FIG. 7, the data recording and playback apparatus 300 is connected to external devices, such as the personal computer 50, and is configured to include an interface 202 that is used for either input and output of contents data or input of visual information; an input and output management unit 203 that manages contents data and visual information; a data recording encoder 204 that encodes the received contents data into a predetermined format for recording the data on the optical disk 100; a visual information recording encoder 205 that converts the received visual information into a predetermined format for recording the information onto the optical disk 100; a decoder 207 that decodes a signal read out by the pickup 201 into a predetermined format; a data recording RAM 208 that is used either to record or to read out contents data; a visual information recording RAM 209 that is used to record visual information; and a system control unit 210 that totally controls the respective component units described above while performing supply and/or reception of necessary control information through a bus 211. The respective units are connected to one another.

For example, the first pickup 301 of the present embodiment serves as a data recording pickup of the present invention, and the second pickup 302 of the present embodiment serves as a visual information recording pickup of the present invention.

Further, for example, the data recording encoder 204 of the present embodiment serves as contents-data dedicated drive signal generating device of the present invention, and the visual information recording encoder 205 of the present embodiment serves as visual-information dedicated drive signal generating device of the present invention.

Further, for example, the drive shift control unit 206 of the present embodiment serves as selecting device of the present invention, and the system control unit 210 of the present embodiment serves as detecting device and determining device of the present invention.

When recording contents data onto the optical disk 100, the first pickup 301 operates in accordance with a modulated signal generated by the data recording encoder 204.

More specifically, in accordance with the modulated signal generated by the data recording encoder 204, the first pickup 301 causes driving of the semiconductor laser (not shown) provided in the first pickup 301, and causes emanation of a laser beam to the optical disk 100. The laser beam varies in intensity corresponding to information being recorded.

In addition, the first pickup 301 emanates a laser beam of a fixed intensity for playback, receives reflected light thereof through a light receiver unit (not shown), generates a detection signal variable corresponding to intensity variation of reflected light, and outputs the generated detection signal to the decoder 207.

The second pickup 302 has similar performance to the first pickup 301. When recording contents data onto the optical disk 100, the second pickup 302 operates in accordance with a modulated signal generated by the visual information recording encoder 205.

More specifically, in accordance with the modulated signal generated by the visual information recording encoder 205, the second pickup 302 causes activation of a semiconductor laser (not shown) provided in the second pickup 302, and causes emanation of a laser beam to the optical disk 100. The laser beam varies in intensity corresponding to information being recorded.

In addition, the second pickup 302 emanates a laser beam of a fixed intensity for playback, receives reflected light thereof through a light receiver unit (not shown), generates a detection signal variable corresponding to intensity variation of reflected light, and outputs the generated detection signal to the decoder 207.

Thus, according to the present embodiment, the optical disk 100 includes the data recording layer on which contents data is recorded by irradiation of the laser beam, and the visual information recording layer on which the visual information which is visually recognized and indicative of information regarding the contents data is recorded by irradiation of the laser beam. The data recording layer and the visual information recording layer are laminated.

With this structure, according to the present embodiment, when the visual information is recorded to be visually recognized from the surface different from the data recording surface through which the data recording layer is irradiated with the laser beam, identifiable and visual information can easily and accurately be formed in units of the optical disk 100.

Accordingly the management can easily be done for a plurality of optical disks 100 that each enable characters, symbols, and/or other markings to be easily and accurately indicated, compared to the case of handwriting characters, symbols, and/or other markings indicative of the contents of the contents data.

Further, according to the present embodiment, in the case that the structure is thus formed to include the data recording layer and visual information recording layer respectively provided by being laminated, the structure is the same as that of the conventional optical disk 100. The optical disk 100 of the present embodiment, therefore, can be manufactured by a manufacturing method for the conventional optical disk 100, so that the manufacturing cost for the optical disk 100 can be reduced, and low cost optical disks 100 can be provided.

Further, according to the present embodiment, the optical disk 100 is structured such that, the visual information is recorded onto the visual information recording layer by irradiation of the laser beam, which is visually recognized from the surface different from the data recording surface through which the data recording layer is irradiated with the laser beam.

With this structure, according to the present embodiment, the visual information can be indicated onto the different surface of the data recording surface, that is the surface on which the contents data is not recorded, for example, in the case that the contents data is recorded only onto a single surface. As such, when managing a plurality of optical disks 100, the optical disks 100 can be accurately identified from one another, therefore making it possible to improve the usability for users.

According to the present embodiment, the structure is formed such that the visual information is recorded onto the visual information recording layer by irradiation of the laser beam from the surface different from the data recording surface.

With such a structure, in the present embodiment, the visual information is recorded by irradiation of the laser beam from the surface different from the data recording surface. Accordingly, when the contents data is recorded only onto the single surface, for instance, the visual information is indicated on the surface onto which the contents data is not recorded. As such, when managing a plurality of optical disks 100, the optical disks 100 can be accurately identified from one another, consequently making it possible to improve the usability for users.

Further, according to the present embodiment, the optical disk 100 has the structure in which the data recording layer is provided on the first substrate 110 and the visual information area 123 is provided on the second substrate 120, so that the structure is the same as that of the conventional optical disk 100. The optical disk 100 of the present embodiment, therefore, can be manufactured by the manufacturing method for the conventional optical disk 100. Consequently, the manufacturing cost for the optical disk 100 can be reduced, and low cost optical disks 100 can be provided.

Further, according to the present embodiment, on the visual information recording layer there are provided the visual information area 123 for recording the visual information; and the second read-in area 122 in which the substrate information indicative of the visual information recording layer, the visual information management information indicative of the presence or absence of the record of the visual information, and the address management information indicative of the recordable area for visual information are recorded.

With this structure, in the present embodiment, readout of the various types of data recorded in the second read-in area 122 makes it possible to determine the possibility/impossibility of recording onto the optical disk 100 currently being irradiated with the laser beam, the propriety of the visual information recording surface on the surface of the optical disk 100, and the area on which visual information can be recorded. Consequently, visual information can be accurately and easily recorded onto the optical disk 100.

Further, according to the present embodiment, the structure is formed such that, the visual information area 123 in which the substrate information indicative that the visual information recording layer is regularly recorded is provided on the visual information recording layer.

With this structure, in the present embodiment, even when the visual information area 123 has been searched by the pickup 201, it is possible to recognize that the optical disk 100 is provided with the visual information area 123.

Further, according to the present embodiment, on the data recording layer are provided the data recording area for recording the contents data; the first read-in area 114 in which at least one of the recording layer information indicative that the recording layer is the corresponding data recording layer, and recording medium information indicative that the visual information recording layer is provided on the optical recording medium.

According to the present embodiment, with the structure described immediately above, readout of the various types of data information recorded in the first read-in area makes it possible to determine the possibility/impossibility of recording visual information onto the optical disk 100 currently being irradiated with the laser beam and the propriety of the visual information recording surface on the surface of the optical disk 100. Consequently, visual information can be accurately and easily recorded onto the optical disk 100.

Further, in the present embodiment, on the data recording layer, there provided the data management area in which at least either one of the recording management information indicative of the presence or absence of the record of visual information and the area information indicative of the recordable area for visual information is recorded.

With this structure, in the present embodiment, when, for example, recording respective contents data and visual information onto the optical disk 100 by using the different pickups 301, 302 from different surfaces, readout of the various types of data recorded in the first read-in area 114 existing on the data recording surface makes it possible to determine the possibility/impossibility of recording visual information onto the optical disk 100 currently being irradiated with the laser beam, the propriety of the visual information recording surface on the surface of the optical disk 100, and the area in which visual information can be recorded. Consequently, visual information can be accurately and easily recorded onto the optical disk 100.

Although the second pickup 302 of the present embodiment has the equivalent performance to the first pickup 301, accurate recording is not basically necessary for recording visual information. As such, since a light spot to be irradiated with the laser beam may be wide, so that the second pickup 302 may be configured either to have a lower NA (numerical aperture) than the first pickup 301 or to use a semiconductor laser of a long laser-beam wavelength.

Accordingly, in this case, with the second pickup 302 irradiating the laser beam with a low NA or with a long-wavelength semiconductor laser, visual information can be quickly recorded in the visual information area 123. In addition, since a low-NA pickup 302 or a long-wavelength pickup 302 is relatively inexpensive, the data recording and playback apparatus 300 can be provided at a reduced price.

According to the present embodiment, in principle, the respective contents data and visual information are discretely recorded onto the data recording layer and the visual information recording layer. However, of course, contents data and visual information may be recorded onto the two respective data recording layer and visual information recording layer by synchronously controlling the respective first and second pickups 301 and 302.

Further, in the present embodiment, the substrate information, address management information, visual information management information, and visual-information contents information are recorded in the second read-in area. However, of course, a part or all of the items of data may be recorded in the first read-in area.

In this case, these items of data are readout or recorded by the first pickup 301, and the second pickup 302 is controlled by the system control unit 210 in accordance with the respective items of data having been read out.

The invention claimed is:

1. An optical recording medium comprising:
   a data recording layer which is provided to record contents data upon irradiation of an optical beam, and
   a visual information recording layer including
   a visual information recording area provided for recording only visual information, which is visually recognizable, by irradiating the optical beam; and
   a visual information management area where first recording layer information is previously recorded so as to be readable,
   wherein the visual information recording layer is formed on a side opposite to the data recording layer, and
   the first recording layer information includes information indicating that the layer where the first recording layer exists is the visual information recording layer, visual information management information indicative of presence or absence of record of visual information onto the visual information recording area, and the area information indicative of the recordable area of the visual information on the visual information recording area.

2. The optical recording medium according to claim 1, wherein
   the first recording layer information is regularly arranged in the visual information management area.

3. The optical recording medium according to claim 1, wherein
   any one of visual information management information indicating whether or not record of the visual information exists in the visual information recording area and area information indicative of a recordable area of the visual information is recorded in the visual information management area.

4. The optical recording medium according to claim 1, wherein
the visual information is recorded by irradiating a laser beam on a side of the data recording layer of the optical recording medium.

5. The optical recording medium according to claim 1,
wherein in the visual information management area, visual-information contents information that is indicative of the contents of visual information after the visual information has been recorded and that is indicative of information of an address at which the visual information has been recorded.

6. A data recording apparatus that records visual information onto an optical recording medium including
a data recording layer provided to record contents data upon irradiation of an optical beam, and
a visual information recording layer including
a visual information recording layer where only visual information visually recognizable is recorded upon irradiation of the optical beam, and
a visual information management area where first recording layer information is recorded, wherein the first recording layer information being recorded upon irradiation of the optical beam so as to be readable, and
wherein the visual information recording layer is formed on a side opposite to the data recording layer, and
the first recording layer information includes information indicating that the layer where the first recording layer exists is the visual information recording layer, visual information management information indicative of presence or absence of record of visual information onto the visual information recording area and the area information indicative of the recordable area of the visual information on the visual information recording area, the data recording apparatus comprising:
an input device which inputs the visual information to be recorded;
a pickup which is used to record the visual information thus inputted;
a visual-information dedicated drive signal generating device which generates a visual-information dedicated drive signal for driving the pickup in accordance with the visual information thus received;
a first detection device which detects the first recording layer information recorded in the visual information management area of the visual information recording layer; and
a determining device which determines a side where the optical beam is irradiated on the optical recording medium in accordance with the result of the detection by the first detection device, wherein
when it is determined by the determining device that the optical beam irradiates the visual information recording layer, the pickup records the visual information on the visual information recording layer in accordance with the visual information-dedicated drive signal.

7. The data recording apparatus according to claim 6, wherein
provided that recording medium information indicating that the visual information recording layer is provided in the optical recording medium is recorded in the data recording layer, and recording medium information indicating that the visual information recording layer is provided in the optical recording medium is recorded in the data management area,
the data recording apparatus further comprising:
a second detecting device which detects the recording medium information recorded in the data management area; and
a second determining device which determines, in accordance with a result of the detection obtained by the second detection device, whether or not it is possible to record visual information onto the optical recording medium, which is irradiated by the optical beam.

8. The data recording apparatus according to claim 6, further comprising:
a contents-data dedicated drive signal generating device that, when the contents data are inputted into the input device, generates a contents-data dedicated drive signal for driving the pickup in accordance with the contents data thus inputted; and
a data recording pickup that is different from a visual-information recording pickup for recording the visual information and that records the contents data into the data recording layer in accordance with the contents-data dedicated drive signal.

9. The data recording apparatus according to claim 8, wherein
the visual information recording pickup has a numerical aperture (NA) lower than that of the data recording pickup.

10. The data recording apparatus according to claim 8, wherein
the visual-information recording pickup emits an optical beam having a wavelength longer than that from the data recording pickup.

11. The data recording apparatus according to claim 6, wherein
the pickup records the visual information onto the optical recording medium by irradiating a laser beam on a side of the data recording layer of the optical recording medium.

12. The data recording apparatus according to claim 6, wherein in the visual information management area, visual-information contents information that is indicative of the contents of visual information after the visual information has been recorded and that is indicative of information of an address at which the visual information has been recorded.

* * * * *